(12) United States Patent
Bruner et al.

(10) Patent No.: US 9,992,607 B2
(45) Date of Patent: Jun. 5, 2018

(54) ESIM IDENTIFICATION DATA

(71) Applicant: Microsoft Technology Licensing, LLC, Redmond, WA (US)

(72) Inventors: John David Bruner, Bellevue, WA (US); Shai Guday, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/288,947

(22) Filed: Oct. 7, 2016

(65) Prior Publication Data

US 2018/0103335 A1 Apr. 12, 2018

(51) Int. Cl.
*H04B 1/38* (2015.01)
*H04W 4/00* (2018.01)
*H04M 1/725* (2006.01)

(52) U.S. Cl.
CPC ....... *H04W 4/001* (2013.01); *H04M 1/72525* (2013.01)

(58) Field of Classification Search
CPC .......................... H04W 4/001; H04M 1/72525
See application file for complete search history.

(56) References Cited

U.S. PATENT DOCUMENTS

| | | | |
|---|---|---|---|
| 8,788,832 B2 | 7/2014 | Guccione et al. | |
| 8,887,257 B2 | 11/2014 | Haggerty et al. | |
| 8,892,165 B2 | 11/2014 | Lodeweyckx | |
| 9,179,294 B2 | 11/2015 | Lodeweyckx | |
| 9,432,067 B2 * | 8/2016 | Li | H04W 4/003 |
| 2009/0253409 A1 | 10/2009 | Slavov et al. | |
| 2012/0047227 A1 | 2/2012 | Haggerty et al. | |
| 2013/0122864 A1 | 5/2013 | Haggerty et al. | |
| 2013/0227646 A1 | 8/2013 | Haggerty et al. | |
| 2013/0303122 A1 | 11/2013 | Li et al. | |
| 2014/0031012 A1 | 1/2014 | Park et al. | |
| 2014/0045460 A1 | 2/2014 | Park et al. | |
| 2014/0134981 A1 | 5/2014 | Park et al. | |
| 2014/0235210 A1 | 8/2014 | Park et al. | |
| 2015/0017950 A1 | 1/2015 | Zhao et al. | |
| 2015/0121495 A1 | 4/2015 | Gao et al. | |
| 2015/0237496 A1 | 8/2015 | Gao et al. | |

(Continued)

FOREIGN PATENT DOCUMENTS

| | | |
|---|---|---|
| EP | 2461613 A1 | 6/2012 |
| EP | 2975870 A1 | 1/2016 |

(Continued)

OTHER PUBLICATIONS

"LTE Quick Reference", Retrieved on: Jun. 12, 2016 Available at: http://www.sharetechnote.com/html/Handbook_LTE_eSIM.html.

(Continued)

*Primary Examiner* — Tuan Pham

(57) ABSTRACT

Mobile communications devices are provisioned using unique device information. A request may be received by a device from an application executing on the device. The request may be for unique identification data for an embedded Universal Integrated Circuit Card (eUICC) installed on the device. In response to the request, the device may access the unique identification data from a persistent storage of the computing device. The unique identification data may be provided to the requesting application via an interface.

20 Claims, 7 Drawing Sheets

(56) References Cited

U.S. PATENT DOCUMENTS

| | | | |
|---|---|---|---|
| 2015/0281942 A1* | 10/2015 | Lee | H04W 48/16 455/434 |
| 2015/0347786 A1 | 12/2015 | Yang et al. | |
| 2016/0014601 A1 | 1/2016 | Mellqvist et al. | |
| 2016/0020802 A1 | 1/2016 | Lee et al. | |
| 2016/0020803 A1 | 1/2016 | Cha et al. | |
| 2016/0020804 A1 | 1/2016 | Lee et al. | |
| 2016/0021529 A1 | 1/2016 | Park et al. | |
| 2016/0088464 A1 | 3/2016 | Hans | |
| 2016/0094930 A1 | 3/2016 | Ramanna et al. | |
| 2017/0149827 A1* | 5/2017 | Sims | H04L 63/20 |

FOREIGN PATENT DOCUMENTS

| | | |
|---|---|---|
| WO | 2014059941 A1 | 4/2014 |
| WO | 2016010312 A1 | 1/2016 |
| WO | 2016091414 A1 | 6/2016 |

OTHER PUBLICATIONS

Suzuki, et al., "Standardization of Embedded UICC Remote Provisioning", In NTT DCOCOMO Technical Journal, vol. 16, No. 2, Dec. 23, 2014, pp. 36-41.

"Embedded SIM Remote Provisioning Architecture", Published on: Dec. 17, 2013 Available at: http://www.gsma.com/connectedliving/wp-content/uploads/2014/01/1.-GSMA-Embedded-SIM-Remote-Provisioning-Architecture-Version-1.1.pdf.

Park, et al., "Secure Profile Provisioning Architecture for Embedded UICC", In Proceedings of Eighth International Conference on Availability, Reliability and Security, Sep. 2, 2013, pp. 1-9.

Angland, Casey, "eUICC Explained", Published on: Jan. 29, 2016 Available at: https://www.emnify.com/2016/01/29/euicc-what-it-is-and-why-it-matters/.

* cited by examiner

ESIM IDENTIFICATION DATA

BACKGROUND

Service providers for communications devices generally require that the communications device have the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or internet data service.

The credentials may reside in a secure container called a Universal Integrated Circuit Card (UICC) or "SIM card." The UICC may be embedded in the communications device, in which case it may be called an embedded UICC (eUICC). The credentials may be provisioned to the UICC or eUICC when manufactured or may be provisioned to the UICC or eUICC remotely while the UICC or eUICC resides in the communications device.

SUMMARY

Illustrative examples of the disclosure include, without limitation, methods, systems, and various devices. In one aspect, mobile devices are provisioned for services. Unique identification data for an embedded Universal Integrated Circuit Card (eUICC) installed on the mobile device is stored in a persistent storage of the mobile device. An interface such as an application programming interface (API) is provided. The API may be configured to receive requests for the unique identification data from applications executing on the mobile device. In response to receiving the requests, the unique identification data may be provided to requesting applications via the API.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Described herein are methods and systems for mapping the International Mobile Equipment Identity (IMEI) of a device to the eUICC ID of that device, storing the mapping, and making the mapping available to allow for seamless provisioning and services. Techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

Figure 1:
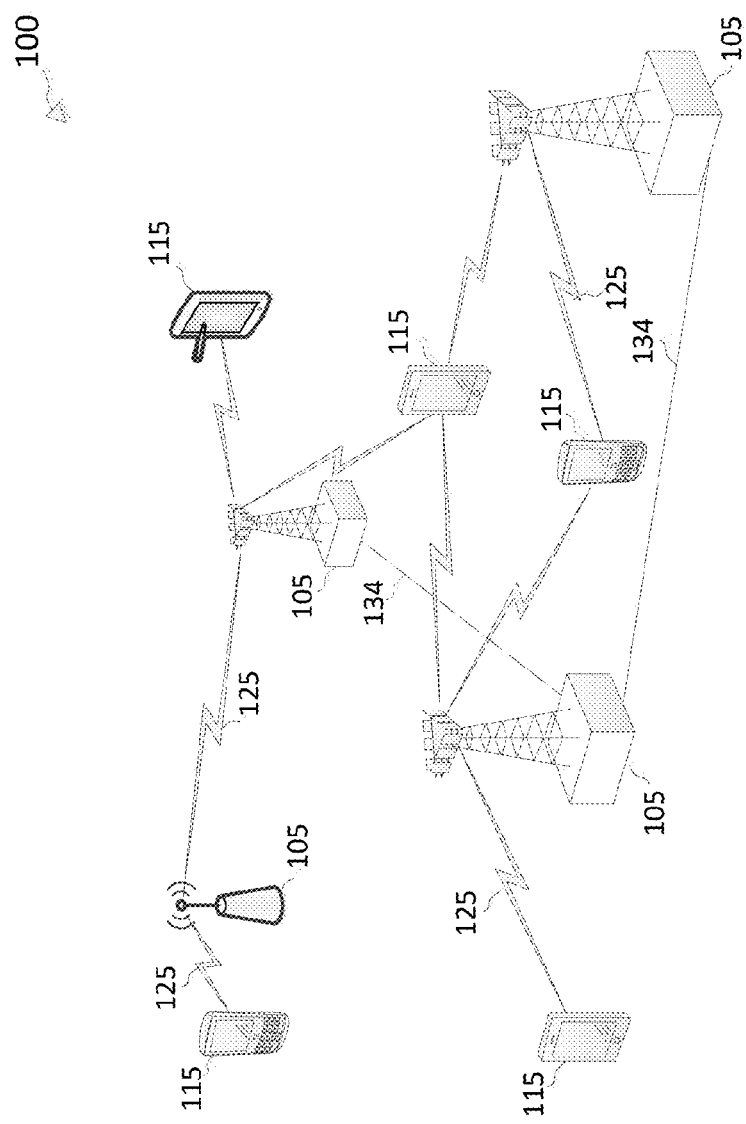
FIG. 1 depicts an example of a networked environment where aspects of the disclosure may be implemented.

FIG. 1 is a block diagram conceptually illustrating an example of a wireless communications system 100, in accordance with an aspect of the present disclosure. The wireless communications system 100 includes base stations (or cells) 105 and mobile devices 115. The base stations 105 may communicate with the mobile devices 115 under the control of a base station controller (not shown), which may be part of a core network or the base stations 105. The wireless communications system 100 may support operation on multiple carriers. Multi-carrier transmitters can transmit modulated signals simultaneously on the multiple carriers. For example, each communication link 125 may be a multi-carrier signal modulated according to the various radio technologies described above.

The base stations 105 may wirelessly communicate with the mobile devices 115 via one or more base station antennas. The base stations 105 sites may provide communication coverage for respective coverage areas. The mobile devices 115 may be located throughout the wireless communications system 100 and may be stationary or mobile. A mobile device 115 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 115 may be a cellular phone, a wireless modem, a wireless communication device, a handheld device, a tablet computer, a laptop computer, or the like. The communication links 125 shown in the wireless communications system 100 may include uplink (UL) transmissions from a mobile device 115 to a base station 105, and/or downlink (DL) transmissions, from a base station 105 to a mobile device 115.

Figure 2:
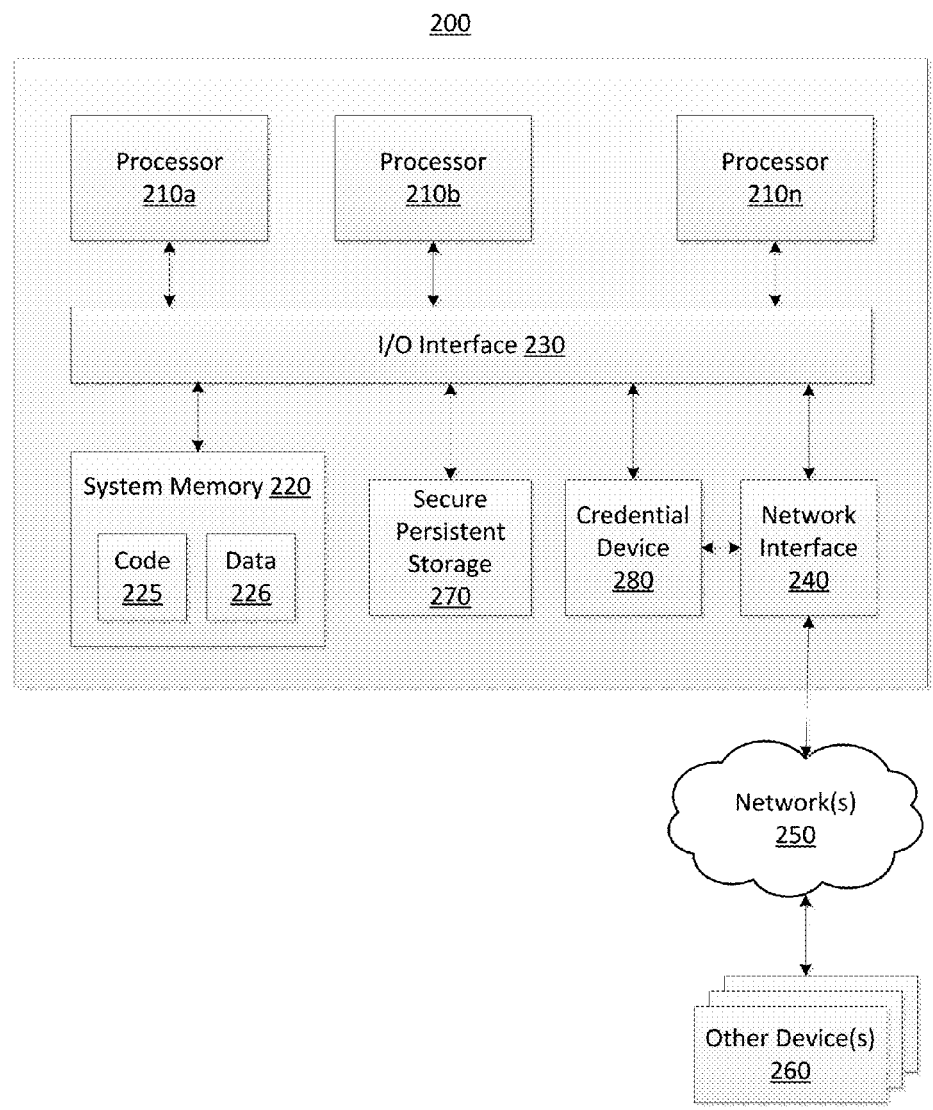
FIG. 2 depicts an example of a computing device where aspects of the disclosure may be implemented.

In at least some embodiments, a computing device that implements a portion or all of one or more of the technologies described herein, including techniques to implement power management functionality of a device, may include a general-purpose computer system that includes or is configured to access one or more computer-accessible media. FIG. 2 illustrates such a general-purpose computing device 200. In the illustrated embodiment, computing device 200 includes one or more processors 210a, 210b, and/or 210n (which may be referred herein singularly as "a processor 210" or in the plural as "the processors 210") coupled to a system memory 220 via an input/output (I/O) interface 230. Computing device 200 further includes a network interface 240 coupled to I/O interface 230.

In various embodiments, computing device 200 may be a uniprocessor system including one processor 210 or a multiprocessor system including several processors 210 (e.g., two, four, eight, or another suitable number). Processors 210 may be any suitable processors capable of executing instructions. For example, in various embodiments, processors 210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 210 may commonly, but not necessarily, implement the same ISA.

System memory 220 may be configured to store instructions and data accessible by processor(s) 210. In various embodiments, system memory 220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 220 as code 225 and data 226. In various embodiments, secure persistent storage 270 may be present, either within System Memory 220 or separate from it, to hold non-volatile privacy-sensitive information.

In one embodiment, I/O interface 230 may be configured to coordinate I/O traffic between processor 210, system memory 220, and any peripheral devices in the device, including network interface 240 or other peripheral interfaces. In some embodiments, I/O interface 230 may perform any necessary protocol, timing, or other data transformations to convert data signals from one component (e.g., system memory 220) into a format suitable for use by another component (e.g., processor 210). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. Also, in some embodiments some or all of the functionality of I/O interface 230, such as an interface to system memory 220, may be incorporated directly into processor 210.

Network interface 240 may be configured to allow data to be exchanged between computing device 200 and other device or devices 260 attached to a network or network(s) 250, such as other computer systems or devices as illustrated in FIGS. 1 through 11, for example. In various embodiments, network interface 240 may support communication via any suitable wired or wireless general data networks, such as types of Ethernet networks, for example. Additionally, network interface 240 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 240 provides cellular communication its operation may be supported by a credential device 280 that may provide authentication, authorization, and other related information and services.

Figure 3:
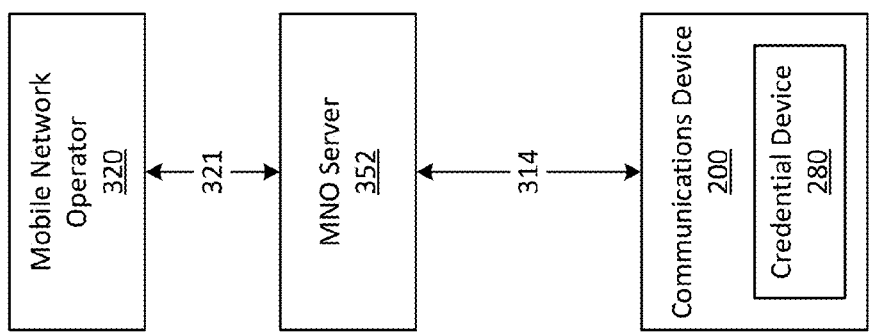
FIG. 3 depicts an example environment for provisioning of mobile devices.
Figure 4:
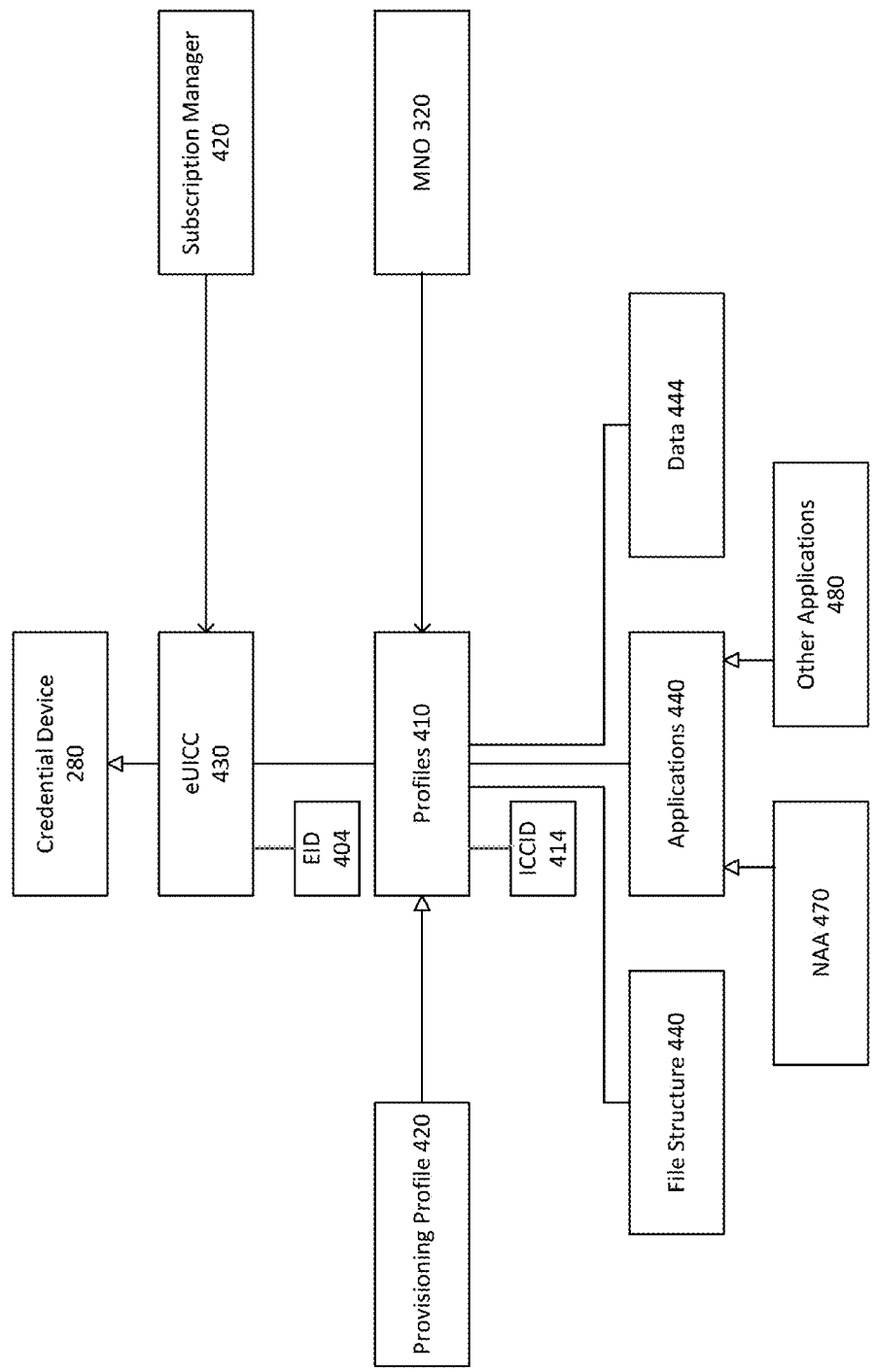
FIG. 4 depicts an example system for provisioning of mobile devices.

In some embodiments, system memory 220 may be one embodiment of a computer-accessible medium configured to store program instructions and data as described herein for FIGS. 1, 3, and 4 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 200 via I/O interface 230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 200 as system memory 220 or another type of memory. Further, a computer-accessible medium may include transmission media or signals such as electrical, electromagnetic or digital signals, conveyed via a communication medium such as a network and/or a wireless link, such as may be implemented via network interface 240. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 280), and the like. A credential device 280 such as a UICC or eUICC may be included in the communications device to ensure the integrity and security of personal data and enables communications with mobile communications providers. Such a communications device may embody aspects of the computing device depicted in FIG. 2, and in some embodiments may incorporate one or more network interfaces 240 that communicates over a cellular network.

A eUICC may enable the service subscription used by the communications device to be securely reconfigured without physically adding or removing the eUICC from the communications device. An eUICC may hold one or multiple eUICC profiles, with one being typically active at one time. An eUICC profile, as used herein, generally refers to the client information associated with a network subscription, and embodiments are not limited to any particular eUICC system. A eUICC profile, may include a combination of file structure, data, and applications associated with the service credentials provisioned onto a credential device and which enable the communications device to use the subscription services associated with that profile.

The 3rd Generation Partnership Project (3GPP) has defined specifications for communications devices covering technologies such as Global System for Mobile Communications (GSM), Universal Mobile Telecommunications System (UMTS), and Long-Term Evolution (LTE). The 3rd Generation Partnership Project 2 (3GPP2) has defined other specifications including Code Division Multiple Access (CDMA). For communications devices complying with these 3GPP or 3GPP2 specifications, their associated credentials are typically embedded in a SIM card. A SIM card may be a removable physical smart card conforming to UICC specification ETSI TS 102 221. The SIM card may be installed when the communications device is manufactured or at the point of sale. Alternatively, a SIM card may be purchased from the mobile operator for use with a communications device that is obtained separately and that has a physical slot conforming to the UICC specification.

Credentials for accessing a communications service provided by MNO 320 may include both data and instructions. When the instructions are executed on a processor, such as the processor of credential device 280 within a mobile communications device 200, the instructions may be configured to cause communication between the processor and a communications service server such that the communications service server may authenticate the credentials and enable the communications services. A set of credentials may be associated with a subscription for communications services from a particular communication service provider. Multiple sets of credentials may be provided for multiple subscriptions.

For example, the GSM Alliance (GSMA) has defined an architecture for remote provisioning of a communications device for subscription services without physically swapping SIM cards for machine-to-machine scenarios by using a eUICC. Some automobile telematics systems are examples of systems that use eUICC devices. While the use of a eUICC may enable limited subscription credential management without having to manage physical smart cards, the GSMA architecture does not enable third parties, such as an MNO's enterprise customers, to manage subscription credentials.

FIG. 3 depicts an example environment for provisioning of profiles. A MNO 320 may own or otherwise control one or more MNO servers 352 through an interface 321. A communications device, also known as User Equipment (UE) 200 may, for example, be a mobile communications device containing a credential device 280. The credential device 280 may refer to a physically removable device containing electronic credentials, such as a SIM card or removable eUICC, a non-removable device that can be electronically provisioned with subscription credentials, such as a soldered eUICC, or the like. The credential device 280 may also refer to a software container that can contain one or more e-profiles and that can be electronically provisioned with subscription credentials in accordance with some embodiments.

Once provisioned with credentials on a credential device 280, UE 200 may be configured to use the provisioned credentials to access MNO subscription services via network connection 314. Network connection 314 may also enable UE 200 to access enterprise services or resources. Network connection 314 may be any type of computer network connection, including wired, WiFi, a cellular data connection, and the like.

In some embodiments, the credential device 280 may be a SIM card or removable eUICC which may be provided by MNO 320 or other manufacturer.

FIG. 4 depicts an example logical structure for a credential device 280 that may include a eUICC 430 containing profiles 410. Each profile may have a globally unique identifier referred to as ICCID 414. In some embodiments, eUICC 430 may be identified by a globally unique value referred to as the eUICC-ID or EID 404.

A credential device 280 may be implemented by an eUICC 430, which may be one embodiment of the credential device 280 of FIG. 3. A physical UICC may be another embodiment. As depicted in FIG. 4, the subscription manager 420 may communicate with the credential device 280 (such as eUICC 430).

At least one of the profiles 410 contained in the eUICC 430 may be used to provide connectivity to the subscription manager 420 for profile management. This profile may be designated as a provisioning profile 420.

GSMA Specification SGP.21 restricts devices from allowing applications or services to directly access an embedded UICC ID. Specifically, GSMA-compliant software can read EID information from the eUICC but is not allowed to share this value with any other software on the device. GSMA-compliant software may provision the device and report EID information. In some embodiments such software is the local profile assistant (LPA) which is configured to read the EID information and provide the information to a subscription manager such as the SMDP+. The GSMA requires that there are no interfaces to the LPA except for the LPA user interface (UI).

It would be advantageous, however, to be able to access the embedded UICC ID in order to enable improved and new services, such as enabling the provisioning of devices over-the-air (OTA) with new SIM profiles dynamically and without, for example, having to have the EID scanned and entered at the retail point of sale. By preventing devices and services from accessing the EID, the user experience may not be as seamless as it could be. For example, by allowing service providers to access the EID, service provides may be able to allow users to provision a device and preload applications via an applications clearing house, without having to go through the UI of the device.

In one embodiment, the GSMA restriction can be circumvented for devices with embedded UICCs by mapping the International Mobile Equipment Identity (IMEI), the unique device identifier known to the manufacturer, to the eUICC ID (EID) installed on the device, which is also known to the manufacturer. By storing this mapping and making the mapping available to service providers, the service providers can map first party devices with cellular capability, for example, and provide for a smoother provisioning process than may be possible by the GSMA MNO providers. Furthermore, the mappings may be made accessible to other providers of other services that may be beneficial to device end users. Once the EID information is accessed by the service provider, the EID mapping can be stored separately without going through the device LPA.

In additional embodiments, in the case of removable UICC cards, a similar mapping can be made from the ICCID of a profile on the removable card to the eUICC ID, the latter which may be used for provisioning.

In some embodiments, the communications device may provide a secure and persistent storage 270 that can be used to store the EID information. The persistent storage (also referred to herein as device ID storage) may be accessible by the original equipment manufacturer (OEM). Examples of such secure and persistent storage may include, for example, a reserved partition in non-volatile storage (e.g., flash memory), an additional secure storage device (such as an embedded secure element), or storage that is secured through use of a trusted platform module.

The secure and persistent storage may be configured to store data that persists across device power cycles, software updates, and device factory resets. In some embodiments, the secure and persistent storage can be, for example, a flash area of memory on the device that is divided into partitions, one of which is configured to store device identification information, while other partitions may be configured for other purposes such as firmware boot sectors or other device specific purposes. The partition may be configured so that it is not publicly accessible and may be secured using encryption or other protection measures. Other embodiments may store the information using other persistent storage means such as a hardware register.

In an embodiment, when the device is manufactured, the OEM may obtain the value of the eUICC EID. For example, the OEM may track the specific inventory that is assembled into each board, allowing for access to the eUICC EID. In other embodiments, the OEM may read the EID value using testing apparatus on the manufacturing line.

The OEM may store the obtained EID value in the secure persistent storage 270. The OEM typically uses this value in other ways and thus already accesses this information in most cases. For example, the GSMA requires that the EID be printed on product packaging in a machine-readable form. The OEM may also maintain an inventory of device identifiers such as a serial number, the IMEI, and the EID.

At runtime, the value of the EID may be used by service providers for operations such as setting up a mobile operator subscription. In some embodiments, an application programming interface (API) may be provided that is not part of the GSMA-compliant implementation. Services and applications may request the EID by sending a request via the API. In response to an API request, the EID may be accessed from the secure and persistent storage and provided to the requesting service or application via the API.

By using the described techniques, the value of the EID may be obtained and used by a method other than the LPA, because using the LPA for this is not currently permitted according to the GSMA requirements. Furthermore, the value of the EID may be obtained and used in the described manner without reading the value from the eUICC card at runtime. In some embodiments, the value of the EID may also be stored on a server or other storage device that may be accessible by service providers. Because the EID value is stored in the secure and persistent storage on the device, the EID value may be available for subsequent access by the user or various services as needed.

In some embodiments, a user of the device may manually enter or scan the EID value or other device ID information on the device via a UI provided for this purpose. For example, if the device ID information was not previously entered by the device OEM, then during runtime the device may render a UI to prompt the user to enter or scan in the information. The user may enter the information manually by accessing the EID information via the device's settings. In another example, the user may scan the EID information if an optical or other readable code is available on the device or on the packing for the device.

Figure 5:
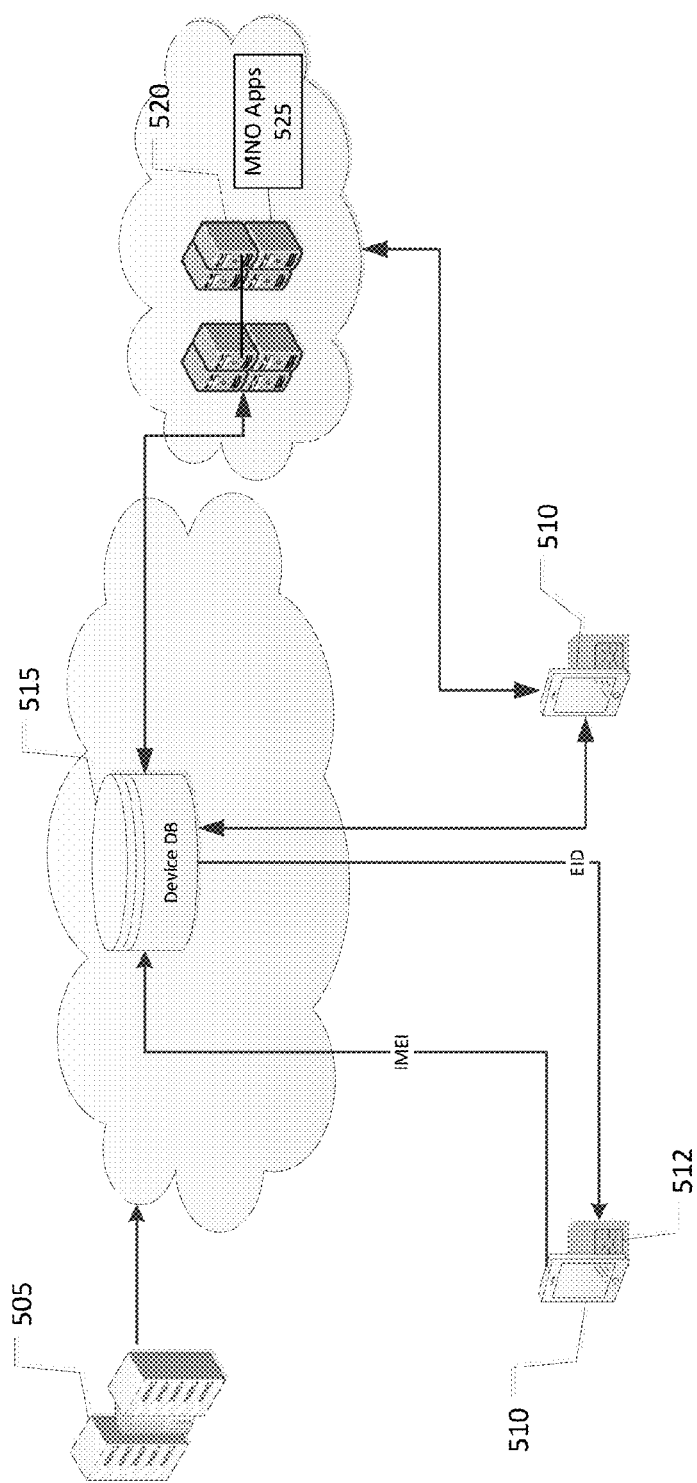
FIG. 5 depicts an example system for provisioning of mobile devices.

Referring to FIG. 5, according to an embodiment of the present disclosure, device unique information for a device 510 (for example, the IMEI or serial number) and device unique information for an eUICC 512 (for example, the EID) may be obtained from the electronic device 510 and stored on database 515. For example, during production and assembly at the OEM 505, the OEM 505 may embed the eUICC in the device and record the IMEI and EID in database 515.

The database 515 may store and manage a database of device unique information. The database may include SIM related information that is mapped to device unique information. Additionally, a user can scan the EID barcode on the packaging during the out-of-box experience (OOBE). The EID may also be stored on the device in a secure and persistent storage as described herein. This storage may be device-dependent, e.g., non-volatile storage or TPM.

A user may access an application clearinghouse 520 (e.g., an app store) to access applications directly or via email, web site, QR code, NFC, etc. Additionally, service providers may access the EID from database 515 through an API that may be secured by a restricted capability that is only available to service providers.

In some embodiments, an MNO may create a profile associated with the EID and upload the profile to its SM-DP+and make it discoverable via the SM-DS. The information may be provided using a push notification service. Alternatively, the information may be polled based on a trigger by a timer or a user action on the device.

In some embodiments, a user may browse the application clearinghouse 520 for MNO applications and download a selected one of the MNO applications 525. The user may also sign up for a service with the MNO. The MNO may retrieve the EID from the device, and the MNO application 525 may create and push the eSIM profile to the device.

Figure 6:
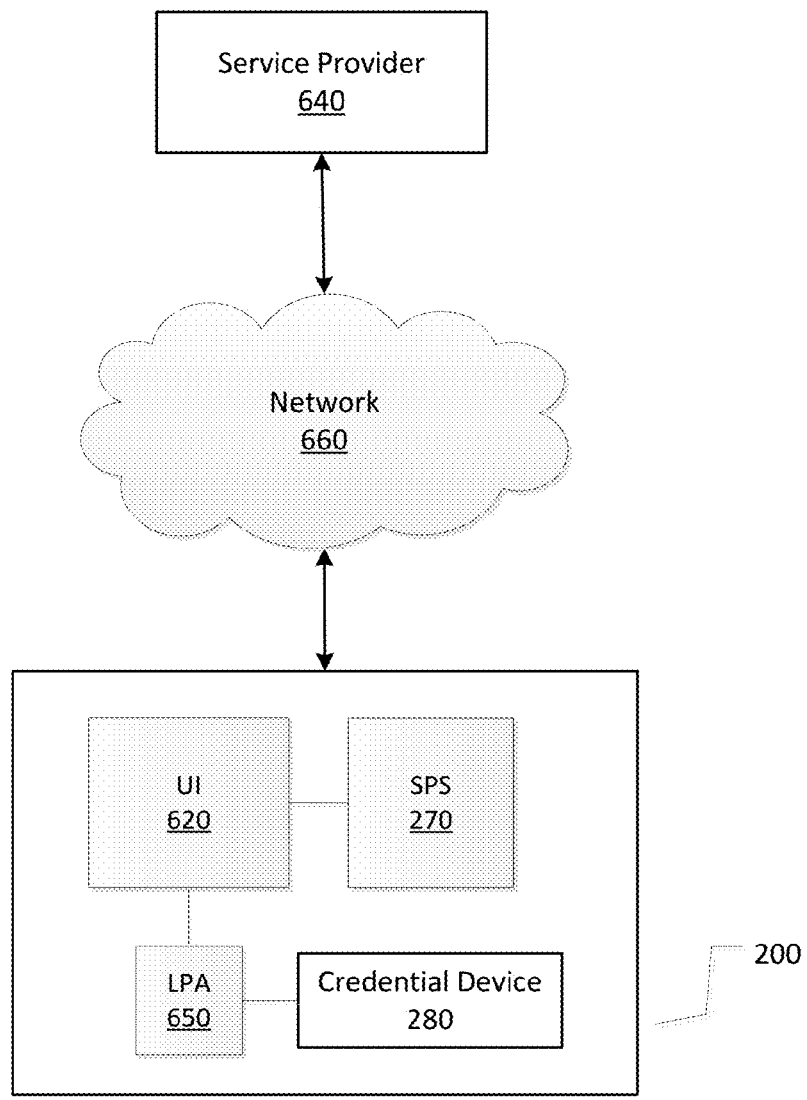
FIG. 6 depicts an example device configured to store identification information.

Referring to FIG. 6, according to an embodiment of the present disclosure, device unique information (for example, the EID) may be obtained for the credential device 610 that is installed on UE 200. The device unique information may be stored in secure and persistent storage (SPS) 270 on UE 200. UI 620 may be provided on UE 200 to allow for entry or retrieval of the stored device unique information. The stored device unique information may also be accessed by local applications running on UE 200 using, for example, an API. Some of the applications may communicate with one or more service providers 640 to access services based on the stored device unique information, when UE 200 is communicatively coupled to a network 660 such as the Internet. The device unique information may be stored and accessed independently of the LPA 650.

Figure 7:
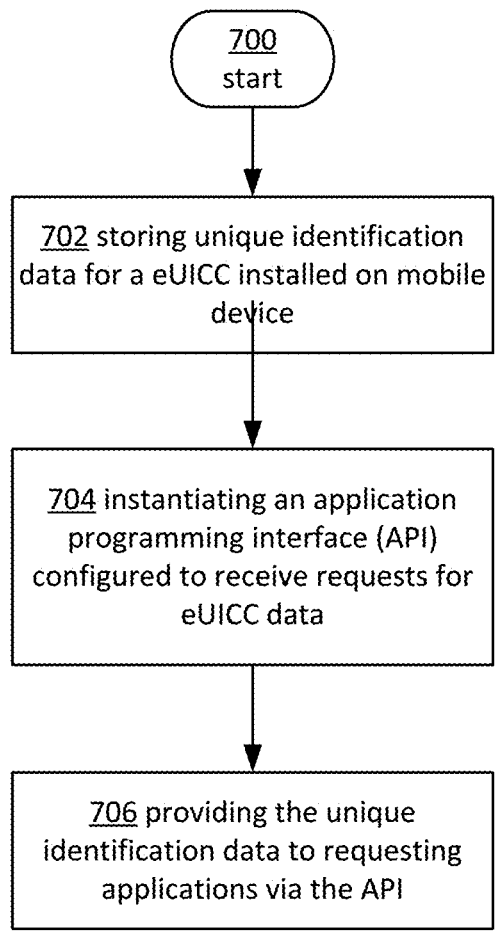
FIG. 7 depicts an operational procedure for provisioning of mobile devices.

FIG. 7 illustrates an example operational procedure for provisioning a mobile device in accordance with this disclosure. In an embodiment, the operational procedure may be implemented in a computing device. The computing device may have a memory that has stored thereon computer-executable instructions that, when executed, cause the computing device to perform operations as described. Referring to FIG. 7, operation 700 begins the operational procedure. Operation 700 may be followed by operation 702. Operation 702 illustrates storing unique identification data for an embedded Universal Integrated Circuit Card (eUICC) installed on the mobile device in a persistent storage of the mobile device.

Operation 702 may be followed by operation 704. Operation 704 illustrates instantiating an application programming interface (API) configured to receive requests for the unique identification data from applications executing on the mobile device. Operation 704 may be followed by operation 706. Operation 706 illustrates in response to receive the requests, providing the unique identification data to requesting applications via the API.

In an embodiment, the unique identification data for the eUICC may be stored during production of the mobile device. Additionally or alternatively, the unique identification data for the eUICC may be received via a user interface of the mobile device. In some embodiments, the user interface may be a graphic user interface of the mobile device and the unique identification data for the eUICC may be entered by a user of the mobile device. In some embodiments, the user interface may be a scanning device and the unique identification data for the eUICC may be entered by scanning an optical code indicative of the unique identification data. For example, the optical code may be a bar code on a package containing the mobile device.

In an embodiment, the unique identification data for the eUICC may be received from a database storing identification data for a plurality of mobile devices. The database may be stored and may be accessible in a secure manner to authorized users such as service providers.

The database may store mappings between the unique identification data for the eUICC, which in some embodiments may be the EID, and corresponding mobile device information such as the IMEI. Some of the applications that request the unique identification data may be operable to configure the mobile device based on the unique identification data.

In some embodiments, the unique identification data for the eUICC may be stored and the data may be provided to requesting applications and services independently of the local profile assistant (LPA) function as defined by the GSMA.

In some embodiments, the unique identification data for the eUICC may further be sent to a networked storage device storing identification data for a plurality of mobile devices. Additionally or alternatively, the unique identification data for the eUICC may be sent to a service operable to provide over-the-air services to the mobile device based on the unique identification data.

In some embodiments, the unique identification data for the eUICC may be encrypted on the mobile device. Additionally, the unique identification data may be stored in a reserved partition in non-volatile storage of the mobile device.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of provisioning a mobile device configured to communicate on a mobile communications network operated by a mobile network operator, wherein the mobile device comprises an embedded Universal Integrated Circuit Card (eUICC) and a secure persistent storage that is not part of the eUICC, the method performed by the mobile device, the method comprising:
    storing an eUICC identifier (EID) of the eUICC in the secure persistent storage of the mobile device;

providing an application programming interface (API) configured to receive requests for the EID from applications executing on the mobile device and not executing on the eUICC; and in response to the requests, obtaining the EID from the secure persistent storage and the providing the obtained EID to the requesting applications via the API, the applications using the EID to authenticate with the mobile communications network operated by the mobile network operator.

2. The method of claim 1, wherein the EID for the eUICC is stored in the secure persistent storage during production of the mobile device.

3. The method of claim 1, wherein the EID for the cUICC eUICC is received via a user interface of the mobile device.

4. The method of claim 3, wherein the user interface is a graphic user interface of the mobile device and the EID for the eUICC is entered by a user of the mobile device.

5. The method of claim 3, wherein the user interface is a scanning device and the EID for the eUICC is entered by scanning an optical code indicative of the unique identification data.

6. The method of claim 1, wherein the EID for the eUICC is received from a database storing identification data for a plurality of mobile devices.

7. The method of claim 6, wherein the EID is mapped to International Mobile Equipment Identity (IMEI) for the plurality of mobile devices.

8. The method of claim 1, wherein said storing the EID, providing the API, and providing the obtained EID are executed independently of a local profile assistant function executing on the mobile device.

9. The method of claim 1, further comprising sending the EID for the eUICC to a networked storage device storing EIDs for mobile devices, respectively.

10. The method of claim 1, wherein at least one of the applications are operable to configure the mobile device based on the EID for the eUICC.

11. The method of claim 1, further comprising sending the EID for the eUICC to a service operable to provide over-the-air services to the mobile device based on the EID.

12. The method of claim 1, wherein the secure persistent storage comprises an encrypted portion storing the.

13. The method of claim 1, wherein a reserved partition in non-volatile storage of the mobile device comprises the secure persistent storage storing the EID.

14. A computing device configured for cellular communication, the computing device comprising:
a network interface configured to wirelessly communicate with cellular base stations of a mobile network operated by a mobile network operator;
an eUICC storing an EID that uniquely identifies the eUICC;
persistent storage storing the EID that uniquely identifies the eUICC;
a memory storing thereon instructions that when executed by a processor of the computing device, cause the computing device to:
receive a request from an application executing on the computing device for the EID of the eUICC that is installed on the computing device, the application not executing on the eUICC;
in response to the request, access the EID from the persistent storage that is part of the computing device, wherein the persistent storage is not part of the eUICC; and
provide the EID accessed from the persistent storage to the requesting application, the application using the provided EID to authenticate with the mobile network or a service thereof.

15. The computing device of claim 14, wherein the EID for the eUICC is stored in a reserved partition in non-volatile storage of the computing device, the reserved partition not part of the eUICC.

16. The computing device of claim 14, wherein the EID for the eUICC is received via a user interface displayed by the computing device.

17. The computing device of claim 14, wherein the EID is provided independently of a local profile assistant function executing on the computing device.

18. A computing device configured to communicate on a mobile communications network operated by a mobile network operator, the computing device comprising an eUICC that comprises an EID, the computing device further comprising a persistent storage, the computing device configured to perform a process comprising:
responding to a request from an application executing on the computing device and not running on the eUICC by accessing the EID from a persistent storage of the computing device independently of a local profile assistant installed on the computing device, wherein the persistent storage is not part of the eUICC, and wherein the EID uniquely identifies the eUICC that is installed on the computing device; and
providing the EID to the requesting application from the persistent storage, wherein the application provides the EID to the mobile communications network which authenticates the EID to authorize access to the mobile communications network or a service thereof.

19. A computing device according to claim 18, wherein the mobile communications network has access to a database that stores associations between EIDs and respective device identifiers, and the authentication is performed based on the EID received from the computing device and based on an association of the EID that is stored in the database, the association associating the EID with an identifier of the computing device.

20. A computing device according to claim 19, wherein the identifier of the computing device comprises an International Mobile Equipment Identity (IMEI).

* * * * *